United States Patent [19]

Ogata et al.

[11] Patent Number: 5,594,944
[45] Date of Patent: Jan. 14, 1997

[54] COMMUNICATION CHANNEL SELECTION METHOD

[75] Inventors: Minoru Ogata, Yokohama; Shoji Suzuki, Atsugi; Shinji Tsuchida, Zama; Yuichiro Tsutsui; Shunji Arai, both of Yokohama; Shigeru Hiroki, Hiratsuka, all of Japan

[73] Assignee: Canon Kabushiki Kaisha, Tokyo, Japan

[21] Appl. No.: 191,755

[22] Filed: Feb. 4, 1994

Related U.S. Application Data

[63] Continuation of Ser. No. 797,927, Nov. 26, 1991, abandoned.

[30] Foreign Application Priority Data

Nov. 27, 1990 [JP] Japan .................................. 2-324785
Mar. 28, 1991 [JP] Japan .................................. 3-089630

[51] Int. Cl.⁶ .................................................. H04Q 7/20
[52] U.S. Cl. ...................... 455/34.1; 455/62; 455/186.1
[58] Field of Search ............................... 455/34.1, 53.1, 455/54.1, 62, 63, 181.1, 184.1, 185.1, 186.1, 186.2, 161.3, 77, 88, 58.2, 34.2, 67.7, 67.1, 226.4; 379/61, 62

[56] References Cited

U.S. PATENT DOCUMENTS

| | | | |
|---|---|---|---|
| 3,764,915 | 10/1973 | Cox et al. | 325/53 |
| 4,114,104 | 9/1978 | Denzene | 455/186.1 |
| 4,228,319 | 10/1980 | DeJager et al. | 179/2 |
| 4,510,623 | 4/1985 | Bonneau et al. | 455/181.1 |
| 4,894,856 | 1/1990 | Nakanishi et al. | 455/34.2 |
| 4,921,464 | 5/1990 | Ito et al. | 455/34.1 |
| 4,965,849 | 10/1990 | Kunihiro | 455/34.2 |
| 5,054,109 | 10/1991 | Blackburn | 455/34.1 |
| 5,093,927 | 3/1992 | Shanley | 455/34.1 |
| 5,093,928 | 3/1992 | Kage | 455/54.1 |
| 5,193,209 | 3/1993 | Maeda et al. | 455/34.2 |
| 5,197,093 | 3/1993 | Knuth et al. | 455/34.1 |
| 5,203,015 | 4/1993 | George | 455/186.1 |
| 5,408,684 | 4/1995 | Yunoki et al. | 455/62 |

FOREIGN PATENT DOCUMENTS

| | | | |
|---|---|---|---|
| 0205055 | 12/1986 | European Pat. Off. | |
| 0280196 | 8/1988 | European Pat. Off. | |
| 0283683 | 9/1988 | European Pat. Off. | |
| 0335742 | 10/1989 | European Pat. Off. | |
| 2219595 | 9/1974 | France | |
| 2357133 | 1/1978 | France | |
| 0208426 | 9/1991 | Japan | 455/34.2 |
| 0289825 | 12/1991 | Japan | 455/34.2 |
| 1423972 | 2/1976 | United Kingdom | |
| 2234142 | 1/1991 | United Kingdom | |

*Primary Examiner*—Reinhard J. Eisenzopf
*Assistant Examiner*—Nguyen Vo
*Attorney, Agent, or Firm*—Fitzpatrick, Cella, Harper & Scinto

[57] ABSTRACT

A wireless channel selecting apparatus includes: a memory to store data indicating whether each of a plurality of wireless speech channels can be selected or not; and a selector to select the wireless speech channels to be used on the basis of the data stored in the memory. The number of times at which the wireless channels have been determined to be disabled is stored as data in the memory. The selection of the wireless speech channels which have been decided to be disabled is inhibited. The wireless speech channels other than the inhibited channels are selected as speech channels to be used. The inhibition of the channel selection is released after the elapse of a predetermined time from the inhibition.

12 Claims, 17 Drawing Sheets

| NUMBER OF ACCESS STOP SPEECH CHANNELS | NUMBER OF ALL SPEECH CHANNELS | STOP SPEECH CHANNEL RATIO (%) $\left(\dfrac{\text{NUMBER OF STOP SPEECH CHANNELS}}{\text{NUMBER OF ALL SPEECH CHANNELS}} \times 100\right)$ | OUTPUT THRESHOLD VALUE OF SPEECH CHANNEL ACCESS AUTHORIZATION TABLE (%) |
|---|---|---|---|
| 10 | 87 | 11.5 | 50 |

FIG. 5

| SPEECH CHANNEL NUMBER | DISABLE TIME ZONE |
|---|---|
| 1 | NONE |
| 2 | 13:00 ~ 16:00   EVERY DAY, EVERY MONTH, EVERY YEAR |
| 3 | 0:00 ~ 4:00   EVEN NUMBER DAY, EVERY DAY, EVERY YEAR |
| 4 | 14:00 ~ 24:00   SATURDAY, SUNDAY, EVERY MONTH, EVERY YEAR |
| 5 | 0:00 ~ 0:00   10 DAY, EVERY MONTH, EVERY YEAR |
| ⋮ | ⋮ |
| 86 | 20:00 ~ 6:00   30 DAY ~ 1 DAY, EVERY MONTH, EVERY YEAR |
| 87 | NONE |

FIG. 7

| TABLE ADDRESS | SET CHANNEL NUMBER | DISABLE TIME ZONE |
|---|---|---|
| #1 | 10 | NONE |
| #2 | 45 | 0:00 ~ 0:00   SATURDAY, EVERY MONTH, EVERY YEAR |
| ⋮ | ⋮ | ⋮ |
| #n | 70 | 1:00 ~ 2:00   EVERY DAY, EVERY MONTH, EVERY YEAR |

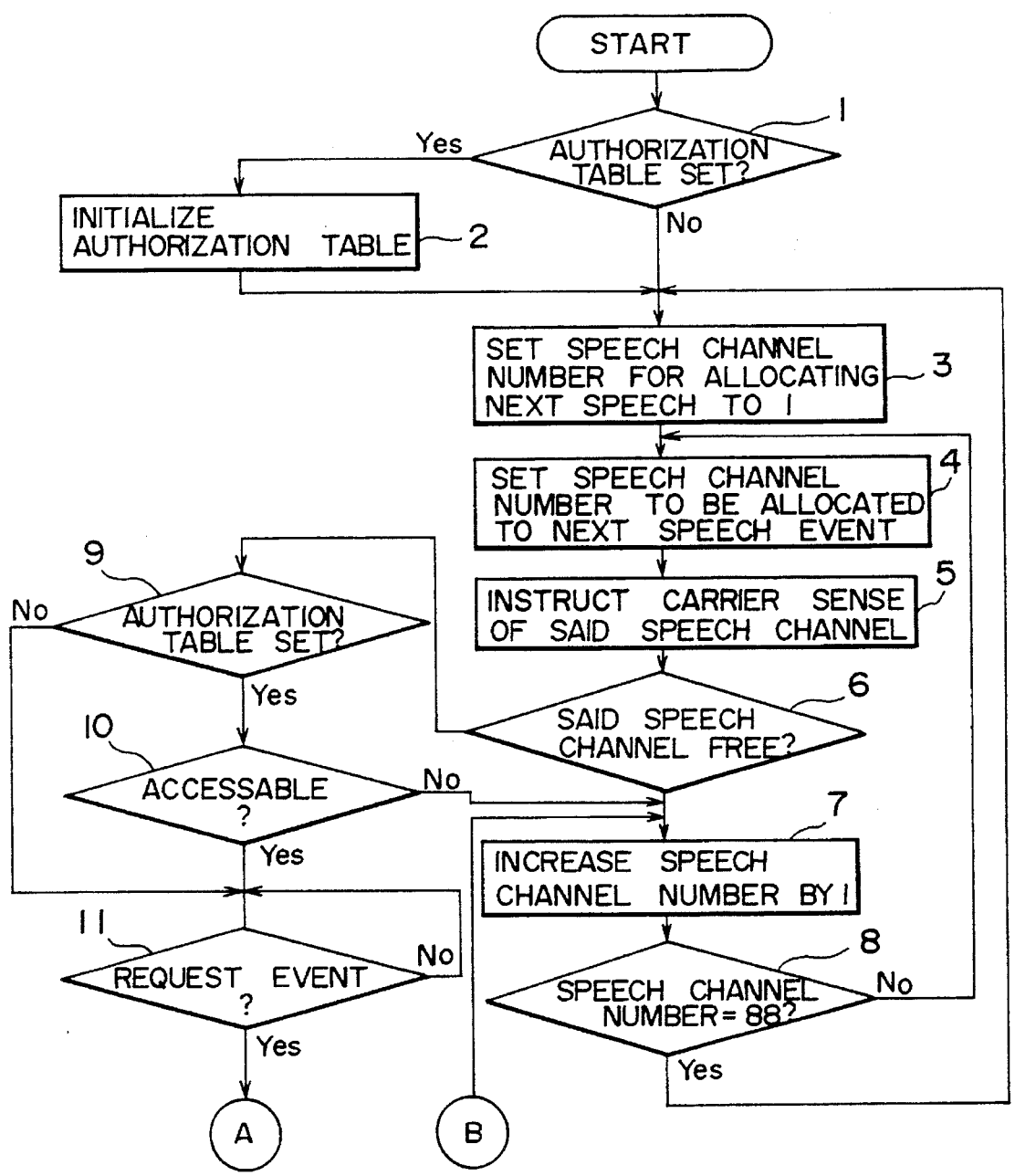

FIG. 10

| SPEECH CHANNEL NUMBER | CONNECTION FAULT NUMBER ||
|---|---|---|
| | CUMULATIVE NUMBER | CONTINUOUS NUMBER |
| 1 | 5 | 4 |
| 2 | 0 | 0 |
| 3 | 0 | 0 |
| 4 | 8 | 4 |
| 5 | 8 | 3 |
| ⋮ | ⋮ | ⋮ |
| 86 | 0 | 0 |
| 87 | 1 | 1 |
| ACCESS AUTHORIZATION THRESHOLD VALUE | 8 | 4 |

FIG. 13

| SPEECH CHANNEL NUMBER | CONNECTION FAULT NUMBER | | ACCESS STOP TIME | | |
|---|---|---|---|---|---|
| | CUMULATIVE NUMBER | CONTINUOUS NUMBER | DAY | HOUR | MINUTE |
| 1 | 5 | 4 | 10 | 10 | 05 |
| 2 | 0 | 0 | 00 | 00 | 00 |
| 3 | 0 | 0 | 00 | 00 | 00 |
| 4 | 8 | 4 | 9 | 19 | 14 |
| 5 | 8 | 3 | 10 | 02 | 41 |
| ⋮ | | | | | |
| 86 | 0 | 0 | 00 | 00 | 00 |
| 87 | 1 | 1 | 00 | 00 | 00 |
| ACCESS AUTHORIZATION THRESHOLD VALUE | 8 | 4 | | | |
| ACCESS STOP PERIOD | 24:00 | 6:00 | | | |
| PRESENT TIME | 10 DAY 14H 02M | | | | |

FIG. 17

| SPEECH CHANNEL NUMBER | CONNECTION FAULT NUMBER | | ACCESS STOP TIME | | |
|---|---|---|---|---|---|
| | CUMULATIVE NUMBER | CONTINUOUS NUMBER | DAY | HOUR | MINUTE |
| 1 | 5 | 4 | 10 | 10 | 05 |
| 2 | 0 | 0 | 00 | 00 | 00 |
| 3 | 0 | 0 | 00 | 00 | 00 |
| 4 | 8 | 4 | 9 | 19 | 14 |
| 5 | 8 | 3 | 10 | 02 | 41 |
| ⋮ | | | | | |
| 86 | 0 | 0 | 00 | 00 | 00 |
| 87 | 1 | 1 | 00 | 00 | 00 |
| ACCESS AUTHORIZATION THRESHOLD VALUE | 8 | 4 | | | |
| PRESENT TIME | 10 DAY 14H 02M | | | | |

FIG. 18

| NUMBER OF ACCESS STOP SPEECH CHANNELS | NUMBER OF ALL SPEECH CHANNELS | STOP SPEECH CHANNEL RATIO (%) $\left(\dfrac{\text{NUMBER OF STOP SPEECH CHANNELS}}{\text{NUMBER OF ALL SPEECH CHANNELS}} \times 100\right)$ | OUTPUT THRESHOLD VALUE OF SPEECH CHANNEL ACCESS AUTHORIZATION TABLE (%) |
|---|---|---|---|
| 10 | 87 | 11.5 | 50 |

COMMUNICATION CHANNEL SELECTION METHOD

This application is a continuation of application Ser. No. 07/797,927 filed Nov. 26, 1991, now abandoned.

BACKGROUND OF THE INVENTION

1. Field of the Invention

The invention relates to a method of selecting a channel for executing a communication from a plurality of communication channels.

2. Related Background Art

In a conventional wireless telephone system, when an information signal is transmitted and received between a fixed apparatus and a moving apparatus, the fixed apparatus selects a free channel from a plurality of speech channels and transmits data regarding the selected free channel through a control channel and communicates with the moving apparatus through the speech channel.

In such a wireless telephone system, the speech channel to connect the fixed apparatus and the moving apparatus is allocated on the basis of the result of the discrimination regarding whether the speech channel is free or not at the allocation time point. When a communication speech is performed by using a free speech channel designated by the control channel, in the case where the connection of the speech channel fails, the connecting operation is interrupted and another free speech channel is newly searched and the connecting operation is again executed from the connection of the control channel on the basis of the free speech channel.

Hitherto, there is also a case where when the connection becomes impossible after a few retrials were performed in order to connect the speech channel for the connection fault of the speech channel, another free speech channel is allocated and a similar trial of the connection is performed.

Hitherto, to avoid a cross modulation of the wireless telephone systems, the allocation of the speech channels of frequencies of harmonics which are odd-number times as high as the basic frequency is inhibited.

SUMMARY OF THE INVENTION

It is an object of the invention to provide a method whereby a preferable communication channel can be selected.

Another object of the invention is to provide a method whereby it is possible to prevent a communication channel having much noise from being selected.

Still another object of the invention is to provide a channel selecting apparatus in which communication channels having much noise are previously stored and a communication channel other than the stored communication channels having much noise is selected.

Another object of the invention is to provide a channel selecting apparatus which changes an accesable communication channel in accordance with the time.

Still another object of the invention is to provide a channel selecting apparatus in which communication channels which could not be connected are stored and a communication channel other than the communication channels in which a possibility such that they cannot be connected is high is selected.

The above and other objects and features of the present invention will become apparent from the following detailed descriptions and the appended claims with reference to the accompanying drawings.

BRIEF DESCRIPTION OF THE DRAWINGS

FIG. 5 is a table diagram showing an example of a speech channel access authorization table;

FIG. 7 is a table diagram showing an example of a management table;

FIG. 8 is a flowchart showing a speech channel allocation algorithm according to the third embodiment;

FIG. 10 is a table diagram of a speech channel access authorization table according to the third embodiment;

FIG. 13 is a table diagram of a speech channel authorization table which is used in the system of the fourth embodiment;

FIG. 17 is a table diagram of a speech channel access authorization table which is used in the system of the fifth embodiment; and FIG. 18 is a table diagram of an access stop speech channel ratio table which is used in the system of the fifth embodiment.

DETAILED DESCRIPTION OF THE PREFERRED EMBODIMENTS

Figure 1:
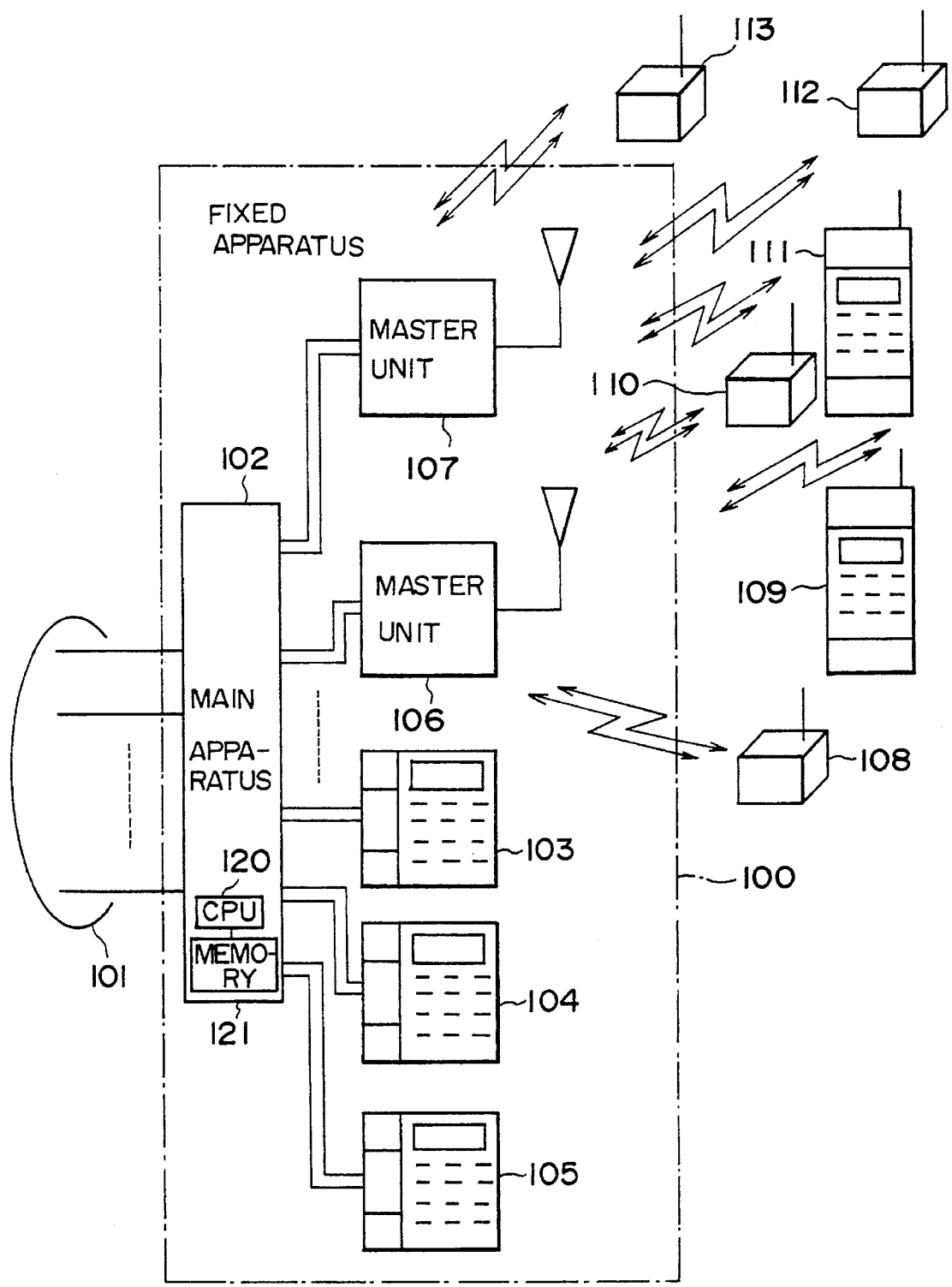
FIG. 1 is a constructional diagram of a wireless telephone system to which the invention is applied.

An embodiment of the invention will be described in detail hereinbelow with reference to the drawings. FIG. 1 is a constructional diagram of a wireless telephone system to which the invention is applied. The system is a key telephone system to which cordless telephones are connected and has a fixed apparatus 100 and moving apparatuses 108 to 113. The fixed apparatus 100 comprises a main apparatus 102, master units 106 and 107, and special telephones 103 to 105. In FIG. 1, reference numeral 101 denotes a line such as an ordinary subscriber's line, PBX (private branch exchange) extension, or the like; 102 the main apparatus which encloses therein one or more external lines and one or more extensions and has an exchange function; 103 to 105 the special telephones connected to the main apparatus 102; 106 and 107 the master units connected to the main apparatus 102; and 108 to 113 the moving apparatuses connected to the master units 106 and 107 in a wireless manner.

Reference numeral 120 denotes a CPU to control the main apparatus 102 and 121 indicates a memory. The number of master units may be also set to one and, in such a case, the master unit solely manages the channels.

Figure 2:
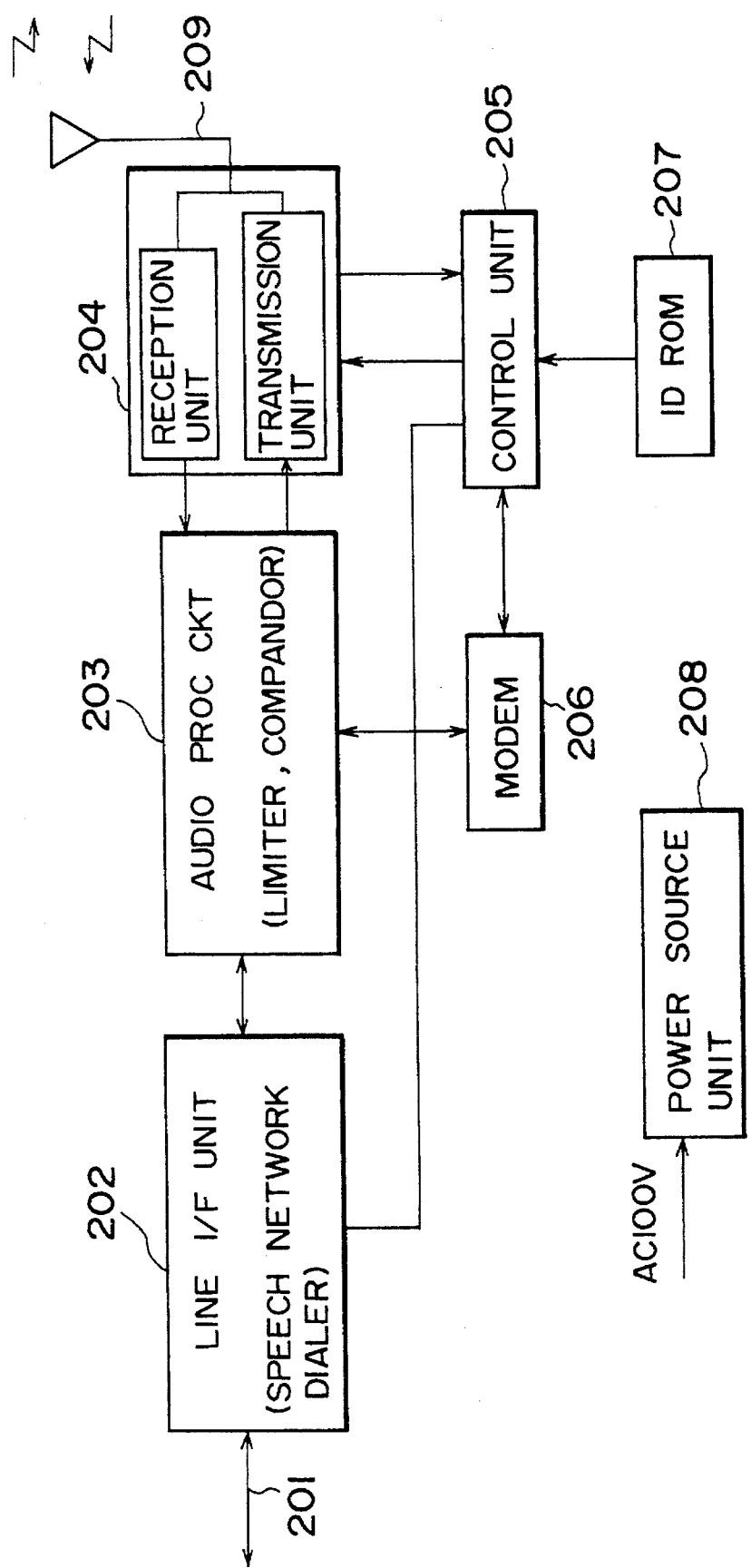
FIG. 2 is a block diagram showing a construction of a master unit constructing the system of FIG. 1.

FIG. 2 is a block diagram showing a construction of a master unit of the cordless telephone. In the diagram, reference numeral 201 denotes a line which is connected to the main apparatus 102; 202 a line interface unit including a speech network and a dialer; 203 an audio processing circuit including a limiter and a compandor; 204 a wireless circuit unit (transmission/reception unit) having a reception unit and a transmission unit; 205 a control unit; 206 a -modem; 207 an IDROM in which ID (identification codes) are stored; 208 a power source unit to supply a power source to each section; and 209 an antenna to transmit and receive a wireless signal.

Figure 3:
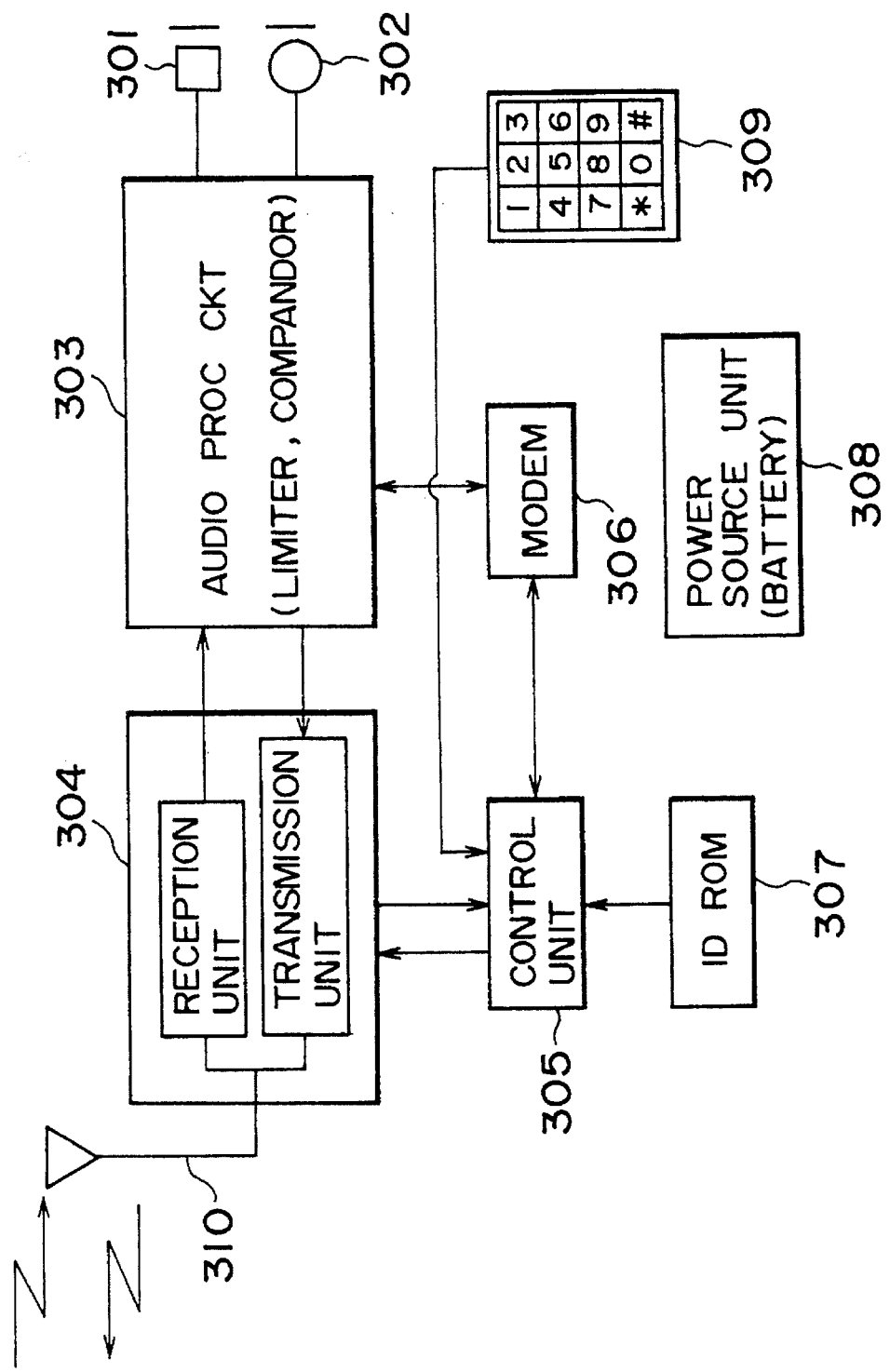
FIG. 3 is a block diagram showing a construction of a moving apparatus constructing the system of FIG. 1.

FIG. 3 is a block diagram showing a construction of a moving apparatus of the cordless telephone. In the diagram, reference numeral 301 denotes a receiver; 302 a transmitter; 303 an audio processing circuit; 304 a wireless circuit unit (transmission/reception unit); 305 a control unit; 306 a modem; 307 an IDROM in which ID (identification codes) are stored; 308 a power source unit to supply a power source to each section; 309 a key pad to input dial data or the like; and 310 an antenna to transmit and receive a wireless signal.

Constructions of FIGS. 1 to 3 and a connection, functions, and the like of the blocks will now be described.

In FIG. 1, a plurality of extensions are enclosed in the main apparatus 102 which encloses therein a plurality of lines 101 from the ordinary subscriber's lines, PBX, and the like and has the exchange function. A plurality of cordless telephone wireless terminals (master units) are connected to the main apparatus 102. Each of the wireless terminals (master units) is connected to a plurality of cordless telephones (moving apparatuses) in a wireless manner.

In FIG. 2, the line I/F unit 202 encloses the line 201 from the main apparatus 102. The line I/F unit 202 is connected to the wireless circuit unit 204 through the audio processing circuit 203. The line I/F unit 202, audio processing circuit 203, and wireless circuit unit 204 are controlled by the control unit 205. Control data is transmitted and received between the audio processing circuit 203 and the control unit 205 through the modem 206. The ID are stored in the IDROM 207 and are read to the control unit 205. A commercially available AC voltage 100 V is applied to the power source unit 208.

Further, in FIG. 3, the transmitter 302 and the receiver 301 are connected to the wireless circuit unit 304 through the audio processing circuit 303. The audio processing circuit 303 and the wireless circuit unit 304 are controlled by the control unit 305. Information from the key pad 309 is supplied to the control unit 305. The control data is transmitted and received between the audio processing circuit 303 and the control unit 305 through the modem 306. The ID are stored in the IDROM 307 and are read to the control unit 305. A power source voltage is supplied from the battery (power source unit) 308.

The case where the wireless telephone connecting method according to the embodiment of the invention is based on the multi-channel access method of a small power type cordless telephone will now be described. According to the above method, two control channels and 87 speech channels are prepared and they are controlled under the management by the main apparatus 102 in FIG. 1.

Figure 4:
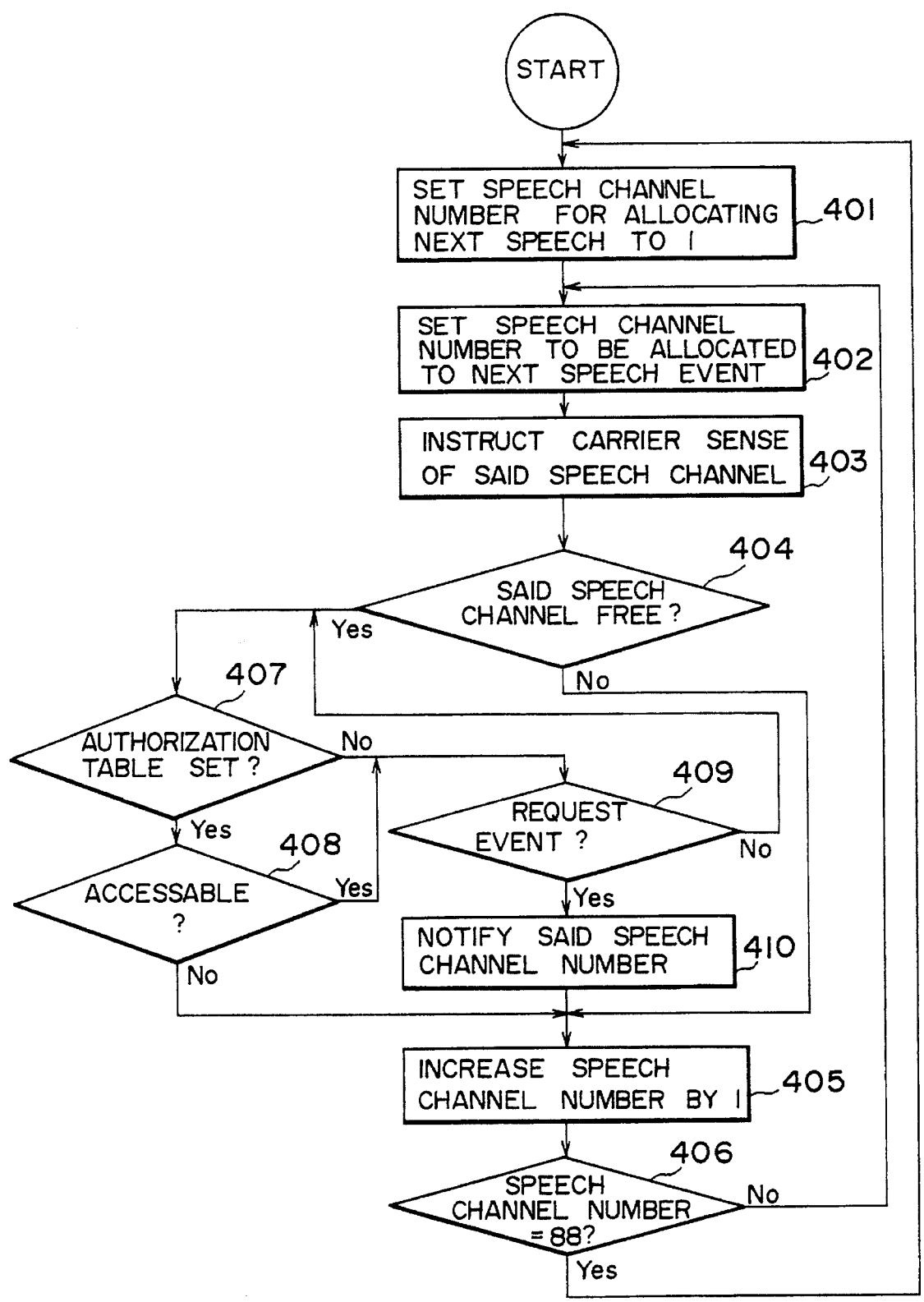
FIG. 4 is a flowchart showing a speech channel allocation algorithm according to an embodiment of the invention.

The embodiment of the invention will now be described hereinbelow with reference to a flowchart of FIG. 4. When the wireless telephone system is installed, as shown in step 401, the CPU 120 of the main apparatus 102 sets the speech channel number 1 which is allocated in response to an allocation request of the wireless speech channel into a predetermined area in the memory 121. The channel shown by the speech channel number 1 indicates that a frequency of a signal which is transmitted from the master unit is set to 380.2125 MHz and a frequency of a signal which is transmitted from the moving apparatus is set to 253.86 MHz. It is now assumed that the speech channel number is increased by +1 each time 12.5 kHz is added to those frequencies. Step 401 relates to a process to initialize the setting of the speech channel number which is allocated to the next speech event. The CPU 120 sets the allocation speech channel number instep 402. After that, the CPU 120 generates a command to instruct one of the master units to examine whether the speech channel is free or not (step 403) and waits for a response (step 404). Thus, when the speech channel is busy, the speech channel number is increased by 1 (step 405). A check is made to see if the speech channel number exceeds the upper limit (87) of the speech channel number permitted in the small power type cordless telephone or not (step 406). When it exceeds, the processing routine is returned to step 401 and the speech channel number is set to 1. If NO in step 406, the processing routine is returned to step 402 and a check is made to see if the speech channel of the new set number is free or not.

When it is detected in step 404 that the speech channel to be allocated to the next speech event is free (step 404), the CPU 120 of the main apparatus 102 checks to see if a speech channel access authorization table has been set in the memory 121 (RAM, floppy disk, or the like) in which the control program is stored or not (step 407). If YES, the CPU 120 discriminates whether it is preferable to set the speech channel or not (accessable or not) by referring to the authorization table (step 408). In the case where the speech channel access authorization table is not set (step 407) and in the case where the speech channel can be accessed (step 408), step 409 follows. In the case where the speech channel access authorization table has been set and the speech channel cannot be accessed (steps 407 and 408), step 405 follows.

FIG. 5 shows an example of the speech channel access authorization table. The speech channel access authorization table can be rewritten during the operation of the system, so that the peculiar channel allocation can be controlled in accordance with the setting environment of the system. In the case where the speech channel access authorization table as shown in FIG. 5 has been stored in a predetermined memory area, a check is made to see if the speech channel set in step 402 can be used or not in accordance with the table of FIG. 5 (step 408). As shown in FIG. 5, when the speech channel is used, a time schedule such as day, time, day of the week, month, year, etc. can be also managed. Thus, there is a possibility such that after the use of the speech channel was authorized in step 408, the use of the speech channel becomes impossible for the waiting time until an event (step 409) of the next speech channel allocation request occurs. Therefore, during the waiting for the allocation request event in step 409, the CPU 120 executes the discriminating steps 407, 408, and 409. When the use of the speech channel is inhibited for the waiting time, the CPU 120 progresses from step 408 to 405 and resets the speech channel number.

As mentioned above, in the embodiment of FIG. 4, a speech channel allocation algorithm can be set in accordance with the setting environment when the system is set or in accordance with the setting environment when it is changed.

Figure 6:
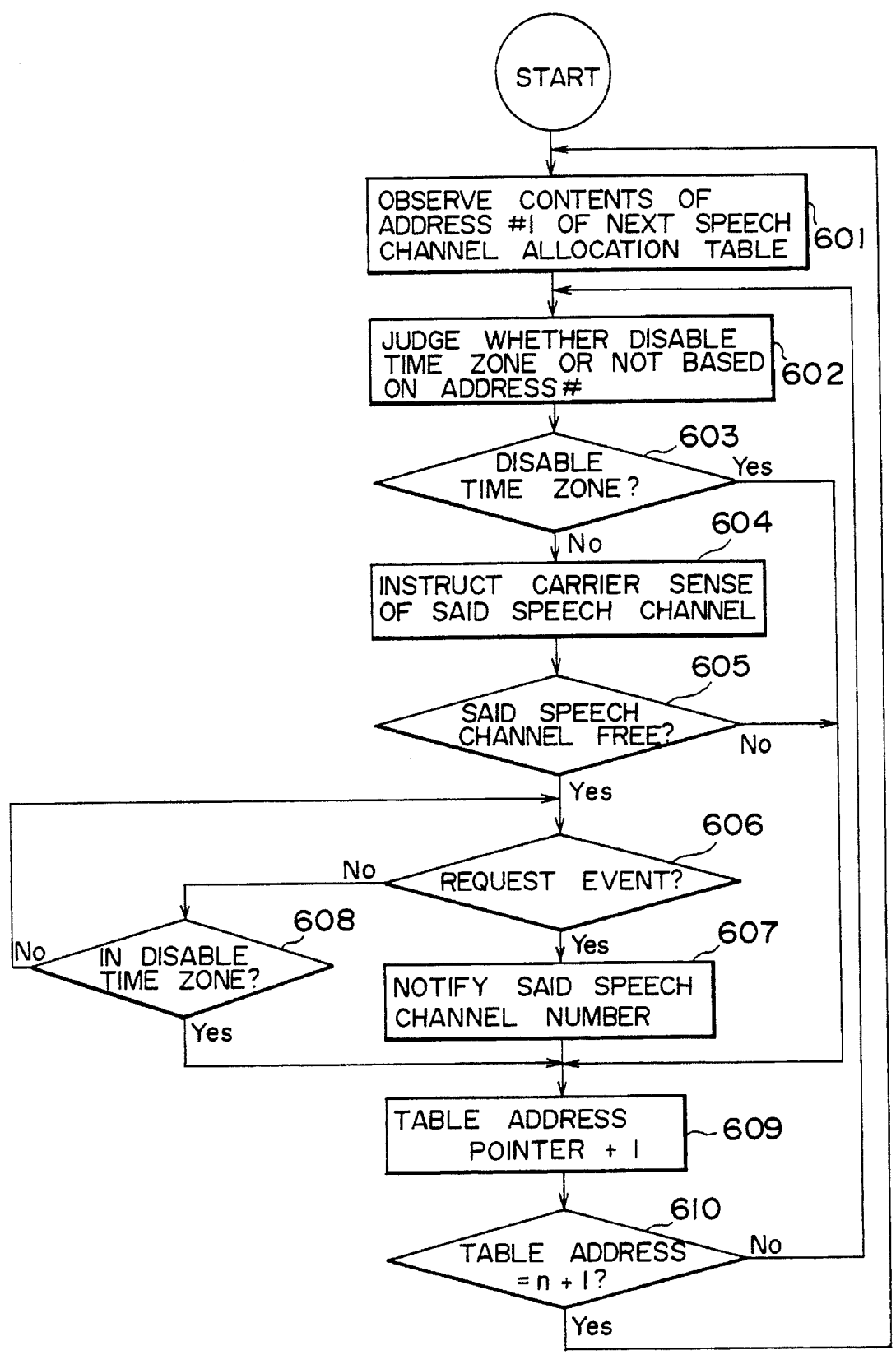
FIG. 6 is a flowchart showing a speech channel allocation algorithm according to the second embodiment of the invention.

FIG. 6 is a flowchart showing the second embodiment of the invention. In the embodiment, the speech channel allocation algorithm is set in accordance with the setting environment when the system is set or when the setting environment changes. FIG. 7 is a format diagram of a speech channel allocation management table (hereinafter, simply referred to as a "management table") which is used at this time. The management table is set into the memory of the main apparatus by,using a keyboard of the master unit, a tool, or the like when the system is set. In the above management table, addresses are added in accordance with the order of the speech channels which are used and disable times of the speech channels and the like are described. The user remakes the management table when the environment of the setting location changes. As shown in FIG. 7, a length of such a management table and an address n can be arbitrarily set. The channels which are not used don't need to be described in the table.

The second embodiment of the invention will be described in accordance with a flowchart of FIG. 6.

A construction of the second embodiment is similar to that shown in FIG. 1.

In the second embodiment, since the speech channel allocation algorithm depends on the management table, the system doesn't normally operate so long as the management table is not set. Therefore, the management table is previously automatically formed by default values when the system is set up, for instance, when a power source is turned on. Accordingly, the CPU 120 extracts the information regarding the set channels and the disable times described in the head address #1 in the management table and discriminates whether the channel can be used or not (step 602) on the assumption that the management table certainly exists in the first step 601 in the flowchart. When the system can be used in step 603, the CPU 120 generates an instruction to one of the master units so as to sense the carrier to see if the set speech channel is free or not (step 604). When the channel is busy, step 609 follows and the next speech channel is set (step 605).

When the speech channel is free in step 605, the CPU 120 discriminates whether there is the speech channel request event or not (step 606). If YES, the speech channel number is notified to the requesting side (step 607). After that, the CPU 120 increases a table address pointer by +1 so as to observe the content of the next address in the management table (step 609). At this time, the management table has a finite length. The CPU 120, accordingly, checks to see if all of the addresses in the table have been accessed or not (step 610). If YES, the address pointer is returned to step 601 and set into the head address of the table. If NO, the channel is set in accordance with the contents of the management table shown in the address pointer of the next management table (steps 610 and 602).

In the case where the channel allocated by the management table lies within the disable time band in step 603, step 609 follows and the CPU 120 observes the next column in the management table. For a period of time when the system waits for the speech channel set request event in step 606, the CPU 120 checks to see if the channel enters the disable time zone of the management table or not in step 608. The set channel is abandoned and the set channel of the next address is performed and the processing routine is returned to the first step 601 (steps 609 and 610).

A wireless telephone connection control procedure according to the multi-channel access method in a wireless telephone system of the third embodiment of the invention will now be explained with reference to FIGS. 8 to 10.

The third embodiment has a construction similar to that shown in FIG. 1.

Figure 9:
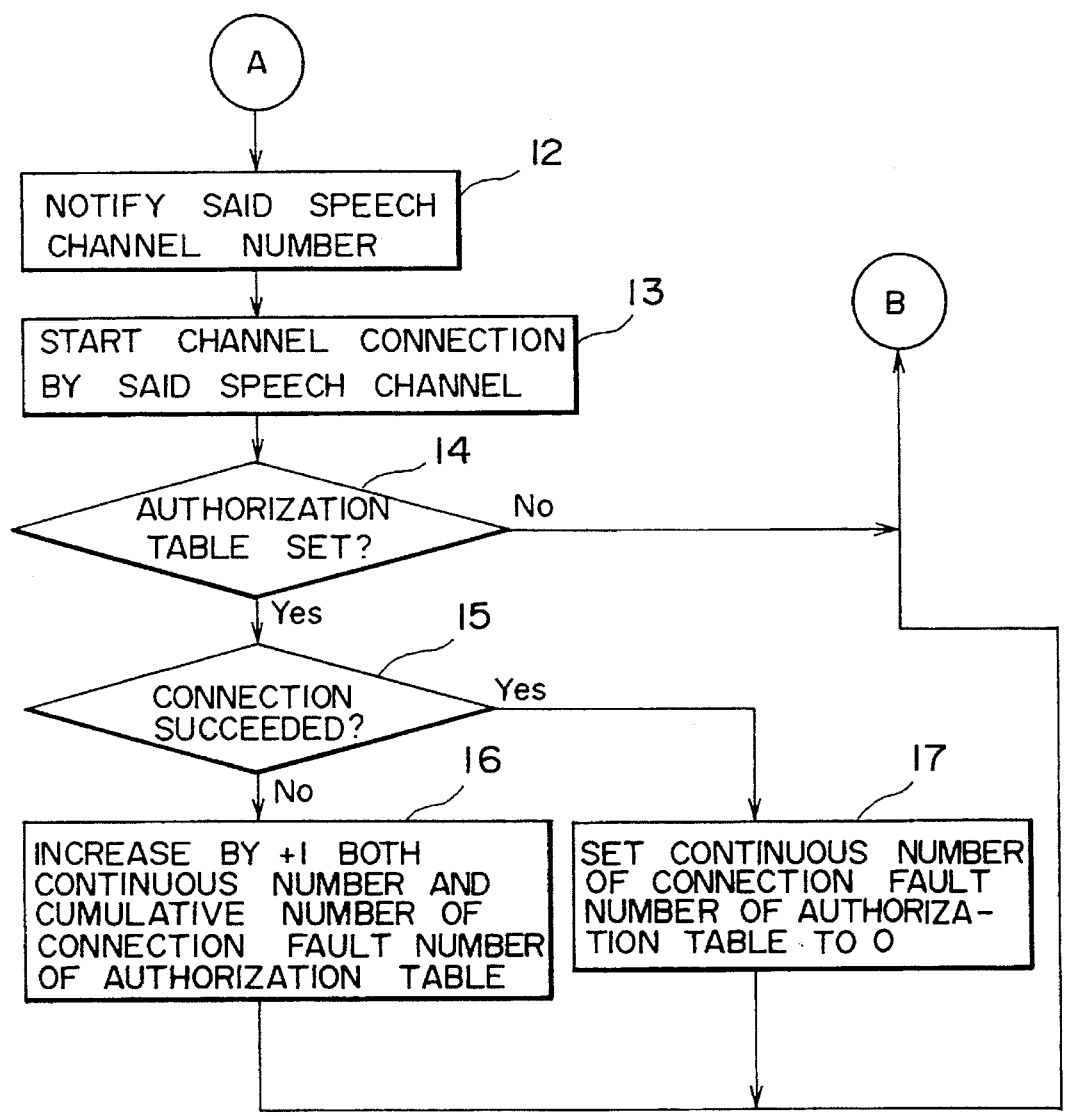
FIG. 9 is a flowchart showing a speech channel allocation algorithm according to the third embodiment.

FIGS. 8 and 9 are flowcharts showing control procedures. In the diagrams, the CPU 120 checks in step 1 to see if a speech channel access authorization table as shown in FIG. 10 has been set when the system is installed or not. The speech channel access authorization table has been stored in the memory 121 such as RAM, floppy disk, or the like and can be rewritten in operation of the system. A peculiar channel allocation, therefore, can be controlled in accordance with a dynamic setting environment of the system. As shown in FIG. 10, the speech channel number, the cumulative number and continuous number of the connection fault number, and the access authorization threshold value are written in the speech channel access authorization table.

When the CPU 120 determines that the speech channel access authorization table has been set in step 1, the processing routine advances to step 2 and the speech channel access authorization table is initialized. That is, in the embodiment, after the cumulative number item and the continuous number item of the connection fault number were respectively cleared to 0, the access authorization threshold value of the speech channel access authorization table is set. The threshold values are set from the outside by a person who installs the system. In the embodiment, it is assumed that a predetermined default values are set. As default values, the threshold value of the cumulative number is set to eight and the threshold value of the continuous number is set to four. When the cumulative number of the connection fault is equal to or larger than eight or when continuous number is equal to or larger than four, this means that the speech channels are closed, namely, the access is stopped.

When it is decided in step 1 that no speech channel access authorization table is set and when the speech channel access authorization table was initialized in step 2, the processing routine advances to step 3 and the speech channel number which is allocated for the allocation request of the wireless speech channel is set to 1. The channel shown by the speech channel number 1 denotes that frequencies of signals which are generated from the master units 106 and 107 are set to 380.2125 MHz and frequencies of signals which are generated from the moving apparatuses 108 to 113 are set to 253.86 MHz, respectively. The speech channel number is increased by 1 each time 12.5 kHz is added to those frequencies.

In the embodiment, the speech channel numbers of 1 to 87 have been designated in accordance with the order from the lower frequency for the purpose of simplicity of explanation in FIG. 10. Those numbers can be also set in accordance with the order from the higher frequency or another order.

In the next step 4, the speech channel number to be allocated to the next speech event is set. In step 5, the CPU 120 generates a command to instruct either one of the master units 106 and 107 to examine whether the relevant speech channel is free or not. After that, the CPU 120 discriminates in step 6 whether the relevant speech channel is free or not. When it is decided that the relevant speech channel is busy as a result of the discrimination, step 7 follows and the speech channel number is increased by 1. Subsequently, a check is made in step 8 to see if the speech channel number exceeds the upper limit "87" of the speech channel number which is permitted for the small power type cordless telephone or not. If YES, the processing routine is returned to step 3. If NO, step 4 follows.

When it is determined in step 6 that the relevant speech channel to be allocated to the next speech event is free, step 9 follows. The CPU 120 of the main apparatus 3 of the fixed apparatus 100 shown in FIG. 1 discriminates whether the speech channel access authorization table written in the memory 121 such as RAM, floppy disk, or the like has been set or not. If YES, step 10 follows and a check is made to see if the relevant speech channel can be set, namely, can be accessed or not with reference to the authorization table. In step 10, the past connection career of the relevant speech channel can be known by examining the numerical values of the cumulative number and continuous number of the connection fault of the speech channel access authorization table. Further, by comparing those numerical values with the preset threshold values, it is possible to judge whether the relevant speech channel can be used or not. Namely, as shown in FIG. 10, in the case where the speech channel access authorization table has been stored in the predetermined memory area, a check is made in step 10 to see if the speech channel of the number set in step 4 can be used or not in accordance with the authorization table.

In the example shown in FIG. 10, the speech channels of the numbers 4 and 5 are closed due to the cumulative number of the connection fault and the speech channels of the numbers 1 and 4 are closed due to the continuous number of the connection fault, respectively.

When it is determined in step 10 that the relevant speech channel cannot be accessed, step 7 follows. When it is decided in step 9 that no speech channel access authorization table is set and when it is decided in step 10 that the relevant speech channel can be accessed, the CPU 120 advances to step 11 and checks whether the request event to allocate the relevant speech channel exists or not. If NO, step 11 is repeated until the request event is present.

When the request event exists, the CPU 120 notifies the relevant speech channel number to the master unit on the request destination side in the next step 12. On the basis of the relevant speech channel number, the master units 106 and 107 start the connection of the speech channels with the moving apparatuses 108 to 113 serving as slave units (step 13). The processing routine advances to step 14 and the CPU 120 discriminates whether the speech channel access authorization table has been set or not. When it is determined in step 14 that no speech channel access authorization table is set, that is, in the case where the speech channel is not accessed on the basis of the speech channel access authorization table, step 7 follows. This is because the speech channel for the next speech event is unconditionally decided irrespective of the success or failure of the connection of the speech channel.

When it is decided in step 14 that the speech channel access authorization table has been set, namely, in the case where the access of the speech channel is restricted on the basis of the speech channel access authorization table, step 15 follows and the CPU 120 judges whether the connection of the relevant speech channel has succeeded or not. If YES, the continuous number of the connection fault number of the relevant speech channel access authorization table of the relevant speech channel is cleared to 0 in step 17. After that, step 7 follows.

When the connection fails, step 16 follows and the CPU 120 increases both of the continuous number and cumulative number of the connection fault number of the corresponding speech channel access authorization table of the relevant speech channel by +1. After that, step 7 follows.

According to the embodiment as mentioned above, the speech channel allocation algorithm can be set by deciding the threshold values for permission of the use of the speech channel in accordance with the setting environment when the system is installed or in accordance with the setting environment when it changes without needing the manual operation.

It is also possible to construct in a manner such that a difference between the connection fault number and the success number is calculated and provided for the algorithm to judge the speech channel access authorization and, in the case where the fault number is larger than a predetermined number, the relevant channel is closed.

A wireless telephone connection control procedure according to the multi-channel method in a wireless telephone system according to the fourth embodiment of the invention will now be described with reference to FIGS. 11 to 13.

Figure 11:
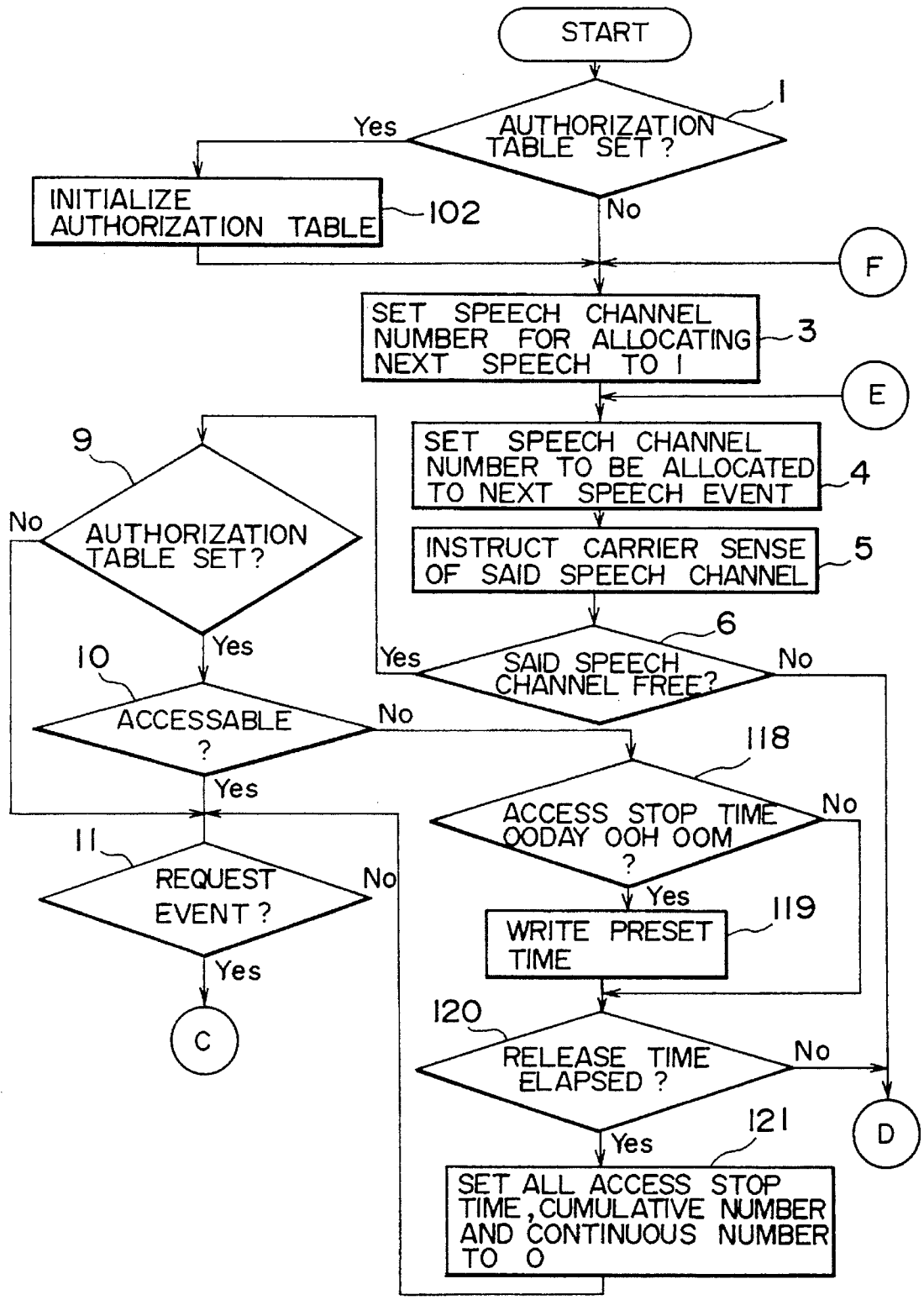
FIG. 11 is a flowchart showing a speech channel allocation algorithm of a system according to the fourth embodiment of the invention.
Figure 12:
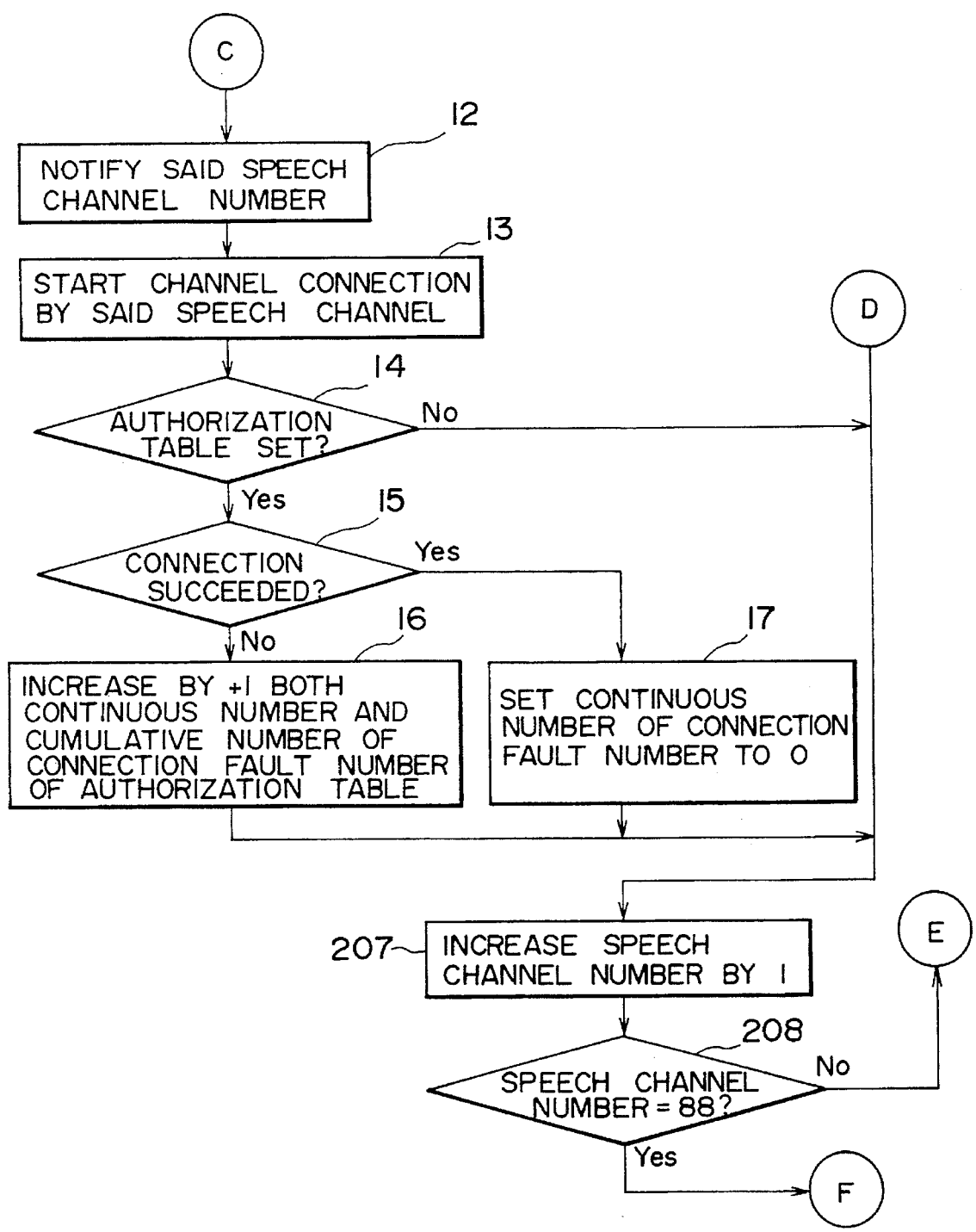
FIG. 12 is a flowchart showing a speech channel allocation algorithm of the system according to the fourth embodiment of the invention.

In FIGS. 11 and 12, the same processes as those shown in FIGS. 8 and 9 mentioned above are designated by the same step numbers and will be described. In the fourth embodiment, as shown in FIG. 13, the access stop time, the access stop release elapsed time, and the present time are additionally written in the speech channel access authorization table of FIG. 10. Upon initialization of the speech channel access authorization table in step 102, in the embodiment, the cumulative number item and continuous number item of the connection fault number and the access stop time in FIG. 13 are cleared to 0. When the access stop time is set to (00 day, 00 hours (H), 00 minutes (M)), the relevant speech channel denotes that the access is not stopped.

The threshold access stop release elapsed time of the access authorization in the authorization table is set. Such a time is set from the outside by the person who installs the system. In the embodiment, however, predetermined default values are inputted. As default values, the cumulative number is set to eight, the access stop release elapsed time due to the cumulation is set to 24 hours, the continuous number is set to four, and the access stop release elapsed time due to the continuation is set to six hours.

The above default values mean that when the cumulative number of the connection fault number is equal to or larger than eight, the relevant speech channel is closed, namely, the access is stopped and that, when 24 hours elapse from the stop of the access, the stop state is released. Similarly, those default values mean that when the connection failure continues four times, the access to the relevant speech channel is stopped and, when six hours elapse from the stop of the access, the stop state is released.

The access stop period due to the cumulative number and the access stop period due to the continuous number differ depending on the setting situation of the system and the environment. Generally, in many cases, the access stop due to the cumulation fundamentally depends on the setting environment. The access stop due to the continuation is a burst-like stop by a special fault.

The present time can be also set in the table of FIG. 13 or at anywhere of the whole system. For convenience of explanation, the present time is set in the speech channel access authorization table. The present time is necessary to judge the access stop release elapsed time by comparing with the access stop time.

In FIGS. 11 and 12, since the processing steps 1 to 17 are substantially the same as those in the third embodiment mentioned above, their descriptions are omitted and the processes in steps 118 to 121 will now be described.

When it is determined in step 10 that the relevant speech channel cannot be accessed, that is, in the case where the access of the relevant speech channel is not permitted by the speech channel access authorization table in spite of the fact that the relevant speech channel is free, the CPU 120 advances to step 118. In step 118, the CPU 120 discriminates whether the access stop time in the speech channel access authorization table is (00 day, 00 H, 00 M) or not. The access stop time is equal to (00 day, 00 H, 00 M) in the case where the present access is stopped for the first time. In such a case, step 119 follows and the present time is written into the access stop time column in the speech channel access authorization table. After that, step 20 follows.

On the other hand, if NO in step 118, the processing routine advances to step 120 without executing step 119. In step 120, the CPU 120 compares the present time of the system and the access stop time and, further, discriminates whether the cause of the access stop is based on the cumulative number or the continuous number. The CPU 120 also discriminates to see if each access stop release time has elapsed or not. When the time when the access stop should be released doesn't elapse, step 207 follows. When the release time has elapsed, step 121 follows. In step 121, all of the access stop time, cumulative number, and continuous number of the relevant speech channel are cleared to 0. After that, step 11 follows.

When the cause of the access stop is based on the continuous number, upon initialization in step 121, the cumulative number is held as it is without setting to 0 so as to be advantageous in operation of the system, and only the continuous number may be also set to 0.

According to the fourth embodiment as mentioned above, the operating efficiency of the system is improved by stopping the access to the speech channel in accordance with the environment after the system was installed. Further, an interference or the like due to the influence by a periodic noise generating source can be eliminated by restarting the stopped speech channel after the elapse of a predetermined time.

Figure 14:
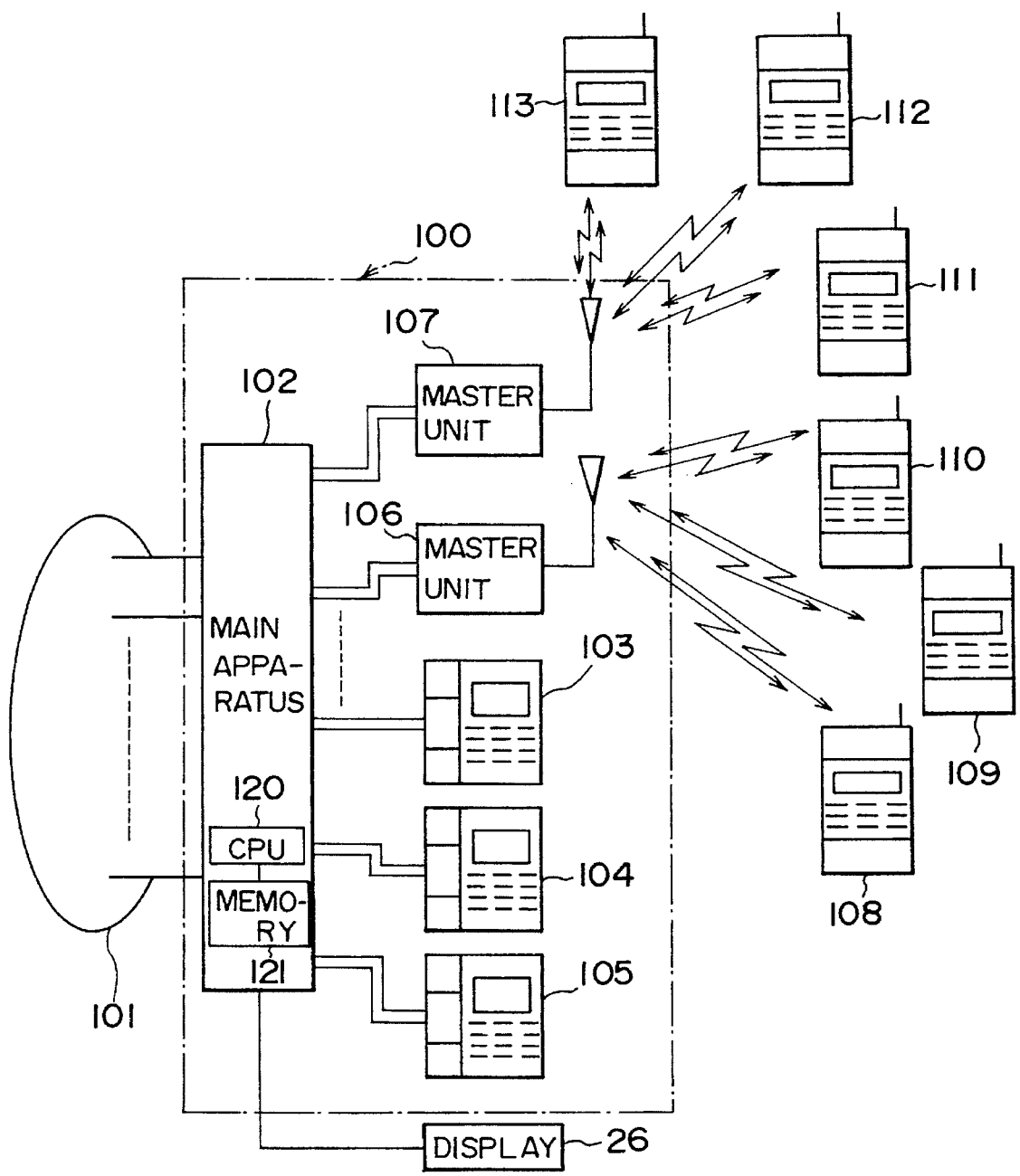
FIG. 14 is a constructional diagram of a system according to the fifth embodiment of the invention.

The fifth embodiment of the invention will now be described with reference to FIGS. 14 to 18. In the fifth embodiment, the same portions as those in the foregoing fourth embodiment are designated by the same reference numerals and will be explained. As shown in FIG. 14, according to a construction of the fifth embodiment, a display 26 which is connected to the main apparatus 102 of the fixed apparatus 100 in the first embodiment is provided to display management data, namely, the reasons of the access stop of the speech channel, the ratio of the number of access stop speech channels to the number of all speech channels, and the like.

As a display 26, a display device such as CRT display, LCD display, or the like, a printer, a facsimile apparatus, or a speaker can be also used.

It is not always necessary to directly connect the display 26 to the main apparatus 102 but the management data can be also generated from a terminal existing at a remote location away from the main apparatus 102 or, further, it can be also transmitted to a facsimile apparatus existing at a remote location and generated.

In step 52, a speech channel access authorization table as shown in FIG. 17 which is stored in the memory 121 of the main apparatus 102 and a stop speech channel ratio table as shown in FIG. 18 in which threshold values to decide whether the data about the reasons of the access stop of the speech channel is supplied to the display 26 or not in accordance with a situation of the use of the speech channel have been registered are initialized, respectively.

That is, in the embodiment, the cumulative number, continuous number, and access stop time of the connection fault number are respectively cleared to 0 in FIG. 17. When the access stop time is equal to (00 day, 00 H, 00 M), this means that the stop of the relevant speech is not stopped.

Access authorization threshold values in the speech channel access authorization table are subsequently set. In a manner similar to the third embodiment, the default values are set such that the cumulative number assumes eight and the continuous number assumes four.

Similarly, in FIG. 18, the number of access stop speech channels is set to 0 and the ratio of the number of access stop speech channels to the number of all speech channels is set to 0, respectively. Further, the number of all speech channels which can be used by the system is written. Such a number is ordinarily set to a fixed value and, in the embodiment, it is set to the upper limit value "87" of the speech channel number which is permitted for the small power type cordless telephone.

Further, output threshold values of the speech channel access authorization table in order to supply the management data to the display 26 are set. Those threshold values are used as reference values when the data of the reasons regarding the access stop of the speech channel is generated. In the embodiment, the default values given into the system at the time of design are set on the assumption that the ratio of the number of access stop speech channels to the number of all speech channels is equal to or larger than 50%. The threshold values, however, can be also set on the assumption that the number of stop channels is equal to or larger than a predetermined value without limiting to the ratio of the number of access stop speech channels to the number of all channels.

In the embodiment, the threshold values at which the data of the reasons about the stop of the allocation of the speech channel is generated are provided in the system and the judgment can be automatically performed. However, the system manager or the like can also instruct the threshold values by the master units 106 and 107 in FIG. 14, the keyboards 309 of the moving apparatuses 108 to 113, or the like in accordance with the necessity. Or, the threshold values can be also generated every elapse of a predetermined time.

In the embodiment, explanation will be made on the assumption that the predetermined default values are provided in the system. In the embodiment, as for the reasons of the access stop of the speech channel, for instance, an intensity or the like of the noise by which the allocation of the speech channel has been stopped is measured by a measuring instrument and stored.

It is not always necessary to set the present time in the table of FIG. 17 but the present time may be also displayed at anywhere of the whole system. For convenience of explanation, the present time is inserted into the speech channel access authorization table. The present time is necessary to judge the access stop release elapsed time by comparing with the access stop time.

After completion of the initialization in step 52 as mentioned above, step 3 follows.

Since the processes in steps 3 to 17, 118, and 119 are similar to those in the fourth embodiment, their descriptions are omitted and the processes in steps 80 to 83 will now be explained.

When it is determined in step 10 that the relevant speech channel cannot be accessed, namely, in the case where the access to the relevant speech channel is not authorized by the speech channel access authorization table in spite of the fact that the relevant speech channel is free, step 118 follows. In step 118, a check is made to see if the access stop time in the speech channel access authorization table is equal to (00 day, 00 H, 00 M) or not.

The access stop time is set to (00 day, 00 H, 00 M) in the case where the present access is stopped for the first time. In such a case, the CPU 120 advances to step 119 and the present time is written into the access stop time column of the speech channel access authorization table. After that, step 80 follows.

On the other hand, if NO in step 118, step 7 follows. In step 80, the CPU 120 increases the access stop channel number in the stop speech channel ratio table as an output management table of the speech channel access authorization table shown in FIG. 18 by +1. The CPU 120 also calculates the ratio of the number of stop channels to the number of all channels and rewrites the value of the stop speech channel ratio column in the stop speech channel ratio table.

As shown in FIG. 18, the number of access stop speech channels, the number of all speech channels, the stop speech channel ratio, and the output threshold values of the speech channel access authorization table are written in the stop speech channel ratio table, respectively. The CPU 120 subsequently advances to step 81 and the ratio of the number of stop channels to the number of all channels which has been calculated in step 80 and the reasons of the access stop of the speech channels by the speech channel access authorization table are displayed on the display 26 shown in FIG. 14.

The CPU 120 subsequently discriminates in step 82 whether the stop channel ratio exceeds the output threshold value in the speech channel access authorization table in FIG. 18 or not. If YES, step 83 follows and the table of FIG. 18 is supplied to the display 26. After that, step 7 follows. When the stop speech channel ratio doesn't exceed the output threshold value in the speech channel access authorization table in step 82, step 7 follows. The display 26 in FIG. 14 continuously displays the data. The manager monitors the display data and can presume the number of access stop speech channels and the cause of the access stop. The manager manually rewrites the authorization table or resets the power source, so that he can restart the use of the speech channel.

For instance, by checking a table shown in FIG. 18, the manager can know that, for instance, since the connection of the speech channel of No. 1 has continuously failed four times before (10 day, 10 H, 05 M), even if such a speech channel is restarted, a possibility of the connection is low or that the speech channel of No. 5 can be connected although it is noisier than the speech channel of No. 1. By collecting such tables everyday, an aging change state of the setting environment of the system can be known.

As mentioned above, the manager can know which one of the closed speech channels should be restarted at which time on the basis of the table generated and displayed onto the display 26. By generating the table of FIG. 18 to the display 26, the speech channel access stop ratio of the system is known, so that the working efficiency of the system can be known.

Although the present invention has been described with respect to the preferred embodiments, the invention is not limited to the foregoing embodiments but many modifications and variations are possible within the spirit and scope of the appended claims of the invention.

What is claimed is:

1. A communication channel selecting method of selecting one of a plurality of communication channels, comprising the steps of:

discriminating which of the plurality of communication channels are in a first state or a second state;

inhibiting a selection of one of the plurality of communication channels when the one of the plurality of communication channels is in the first state or the second state;

selecting the plurality of communication channels to be used for a communication;

releasing, in a case where the one of the plurality of communication channels is in the first state, the inhibition if a first period elapses after inhibiting the selection; and releasing, in a case where the one of the plurality of communication channels is in the second state, the inhibition if a second period elapses after inhibiting the selection, wherein the first state is a state in which the number of times continuously discriminated as the one of the plurality of communication channels should not be used reaches a first value, and the second state is a state in which the accumulated number of times discriminated as the one of the plurality of communication channels should not be used reaches a second value.

2. A method according to claim 1, wherein said communication channels include wireless communication channels.

3. A communication channel selecting method comprising the steps of:

discriminating states of a plurality of communication channels;

inhibiting a selection of the plurality of communication channels according to a discrimination in said discriminating step;

selecting an uninhibited one of the plurality of communication channels to be used for a communication according to the discrimination in said discriminating step; and performing a display according to the discrimination in said discriminating step before the selection of all of the plurality of communication channels is inhibited, according to an excess of the number of the plurality of communication channels to which the selection is inhibited over a predetermined value.

4. A method according to claim 3, wherein the plurality of communication channels include wireless communication channels.

5. A method according to claim 3, wherein the display in said performing step is performed according to a number of the plurality of communication channels having the selection inhibited.

6. A method according to claim 3, wherein a visual display is performed in said performing step.

7. A communication channel selecting method comprising the steps of:

discriminating whether a communication using one of a plurality of communication channels succeeded or failed;

accumulating the number of times that the communication using the one of the plurality of communication channels failed;

counting the number of times that the communication using the one of the plurality of communication channels continuously failed; and inhibiting the communication using the one of the plurality of communication channels, when the accumulated number of times that the communication failed reaches a first value and the number of times that the communication continuously failed reaches a second value smaller than the first value.

8. A method according to claim 7, wherein the plurality of communication channels include wireless communication channels.

9. A communication channel selecting apparatus comprising:

discriminating means for discriminating states of a plurality of communication channels;

inhibiting means for inhibiting a selection of the plurality of communication channels according to a discrimination by said discriminating means;

selecting means for selecting an uninhibited one of the plurality of communication channels to be used for a communication according to the discrimination by said discriminating means; and display means for performing a display according to the discriminating by said discriminating means before the selection of all of the plurality of communication channels is inhibited, according to an excess of the number of the plurality of communication channels to which the selection is inhibited over a predetermined value.

10. An apparatus according to claim 9, wherein the plurality of communication channels include wireless communication channels.

11. An apparatus according to claim 9, wherein said display means performs the display according to the number of the plurality of communication channels for which the selection is inhibited.

12. An apparatus according to claim 9, wherein said display means performs a visual display.

* * * * *

UNITED STATES PATENT AND TRADEMARK OFFICE
CERTIFICATE OF CORRECTION

PATENT NO. : 5,594,944
DATED : January 14, 1997
INVENTOR(S) : Minoru OGATA, et al.

It is certified that error appears in the above-indentified patent and that said Letters Patent is hereby corrected as shown below:

ON THE COVER PAGE:

In the ABSTRACT, item [57]

"includes:" should read --includes--.

In FIG. 11

Element 10, "ACCESSABLE" should read --ACCESSIBLE--.

Figure 15:
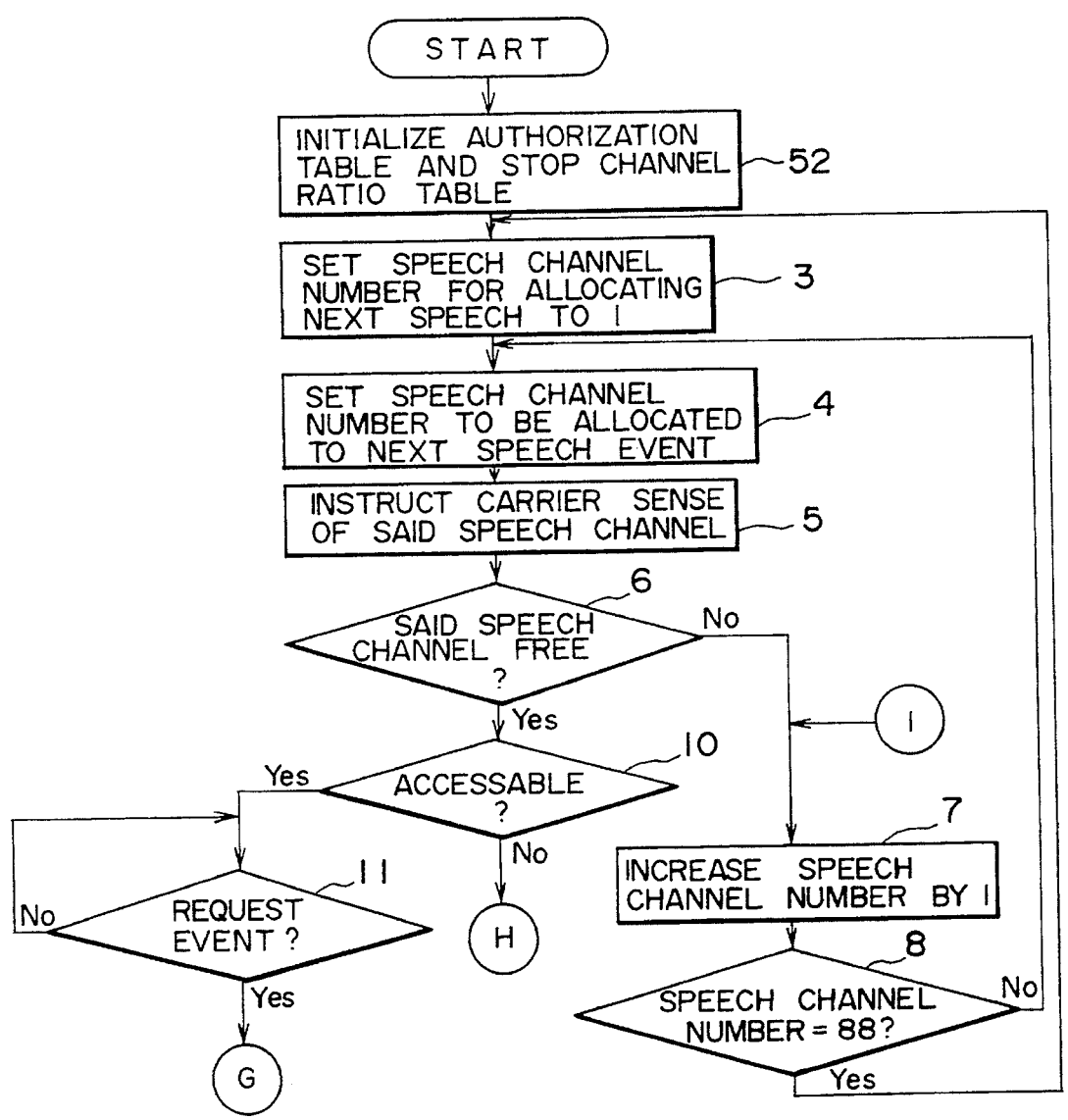
FIG. 15 is a flowchart showing a speech channel allocation algorithm of the system of the fifth embodiment.
Figure 16:
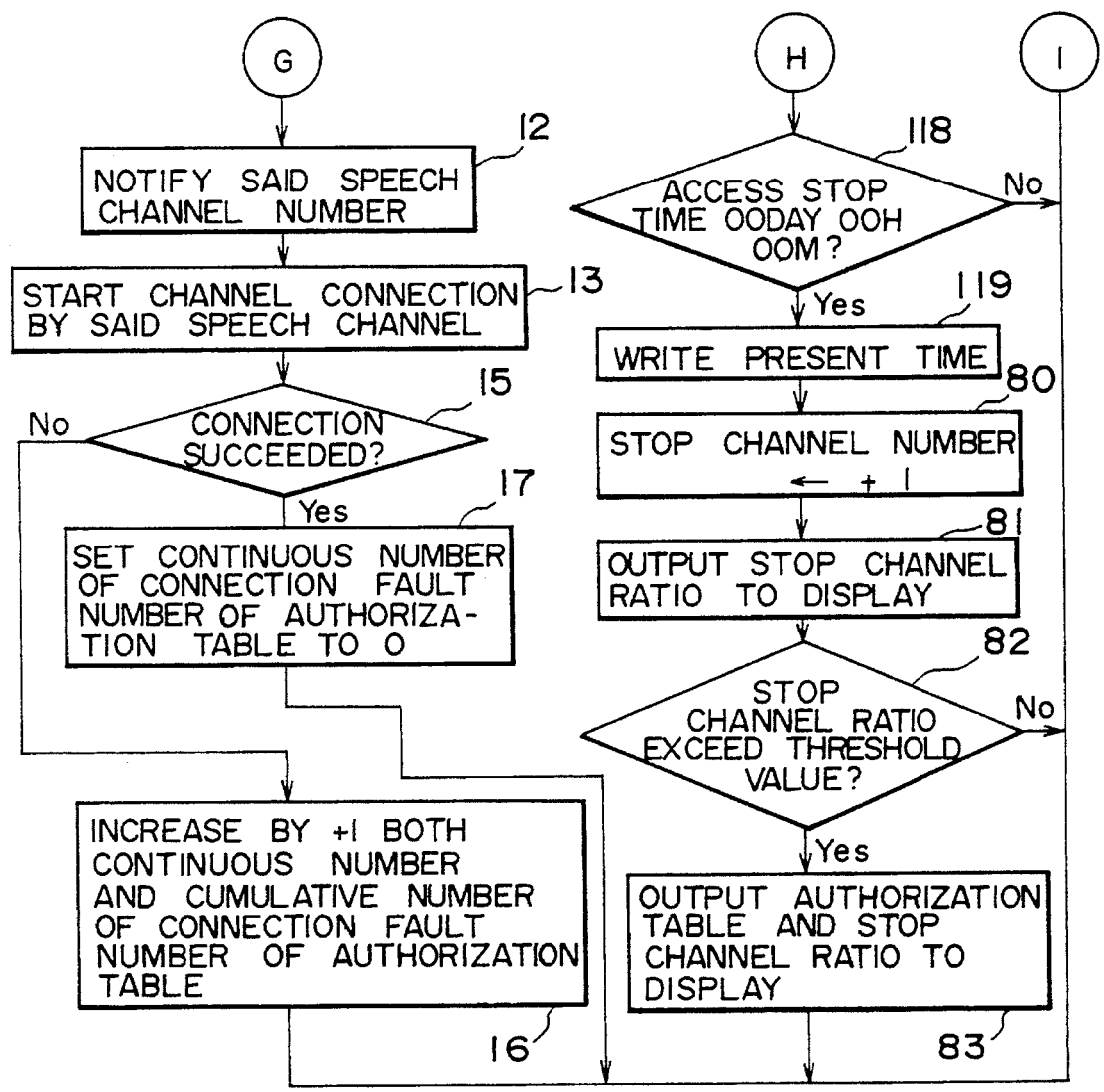
FIG. 16 is a flowchart showing a speech channel allocation algorithm of the system of the fifth embodiment.

In FIG. 15

Element 10, "ACCESSABLE" should read --ACCESSIBLE--.

COLUMN 1

Line 60, "accesable" should read --accessible--.

COLUMN 4

Line 20, "instep" should read --in step--.

COLUMN 5

Line 16, "by, using" should read --by using--.

UNITED STATES PATENT AND TRADEMARK OFFICE
CERTIFICATE OF CORRECTION

PATENT NO. : 5,594,944

DATED : January 14, 1997

INVENTOR(S) : Minoru OGATA, et al.

It is certified that error appears in the above-indentified patent and that said Letters Patent is hereby corrected as shown below:

COLUMN 14

Line 6, "discriminating" (1st. occurrence) should read--discrimination--.

Signed and Sealed this

Twenty-fourth Day of June, 1997

Attest:

BRUCE LEHMAN

Attesting Officer

Commissioner of Patents and Trademarks